United States Patent [19]

Fasching et al.

[11] Patent Number: 5,170,670
[45] Date of Patent: Dec. 15, 1992

[54] THREE AXIS VELOCITY PROBE SYSTEM

[75] Inventors: George E. Fasching; Nelson S. Smith, Jr.; Carroll E. Utt, all of Morgantown, W. Va.

[73] Assignee: The United States of America as represented by the United States Department of Energy, Washington, D.C.

[21] Appl. No.: 683,014

[22] Filed: Apr. 10, 1991

[51] Int. Cl.$^5$ .............................................. G01F 1/56
[52] U.S. Cl. ................................ 73/861.08; 324/687; 324/688; 361/785
[58] Field of Search .................... 73/861.08, 189; 324/686, 687, 688, 690; 361/285

[56] References Cited

U.S. PATENT DOCUMENTS 4,695,789 9/1987 Lambertz et al. ................ 324/690

OTHER PUBLICATIONS

"Radio-frequency probe for bubble size and velocity measurements", Abuaf et al. Rev. Sci. Inst. vol. 50, No. 10, Oct. 1979, pp. 1259–1264.
"Particle Fraction and Velocity Measurement in Gas–Powder Streams by Capacitance Transducers", International Journal of multiphase Flow, Irons and Chang, 9(3), 289–297 (1983).
"Investigation of particle Velocities in a Gas-Solid System", American Institute of Chemical Engineers, Smith and Klinzing, 32(2), 313–316 (1986).
"Local Particle Velocity Measurements with a Laser Anemometer in an Upward Flowing Gas-Solid Suspension", Powder Technology, Birchenough and Mason, 14(1), 139–152 (1976).
"An Impact Probe for Local Analysis of Gas–Solid Flows", Powder Technology, Raso, Tirabasso and Consi, 34(2) 151–159 (1983).

*Primary Examiner*—Donald O. Wood
*Attorney, Agent, or Firm*—David E. Breeden; Stephen D. Hamel; William R. Moser

[57] ABSTRACT

A three-axis velocity probe system for determining three-axis positional velocities of small particles in fluidized bed systems and similar applications. This system has a sensor head containing four closely-spaced sensing electrodes of small wires that have flat ends to establish a two axis plane, e.g. a X-Y plane. Two of the sensing electrodes are positioned along one of the axes and the other two are along the second axis. These four sensing electrodes are surrounded by a guard electrode, and the outer surface is a ground electrode and support member for the sensing head. The electrodes are excited by, for example, sinusoidal voltage having a peak-to-peak voltage of up to 500 volts at a frequency of 2 MHz. Capacitive currents flowing between the four sensing electrodes and the ground electrode are influenced by the presence and position of a particle passing the sensing head. Any changes in these currents due to the particle are amplified and synchronously detected to produce positional signal values that are converted to digital form. Using these digital forms and two values of time permit generation of values of the three components of the particle vector and thus the total velocity vector.

14 Claims, 7 Drawing Sheets

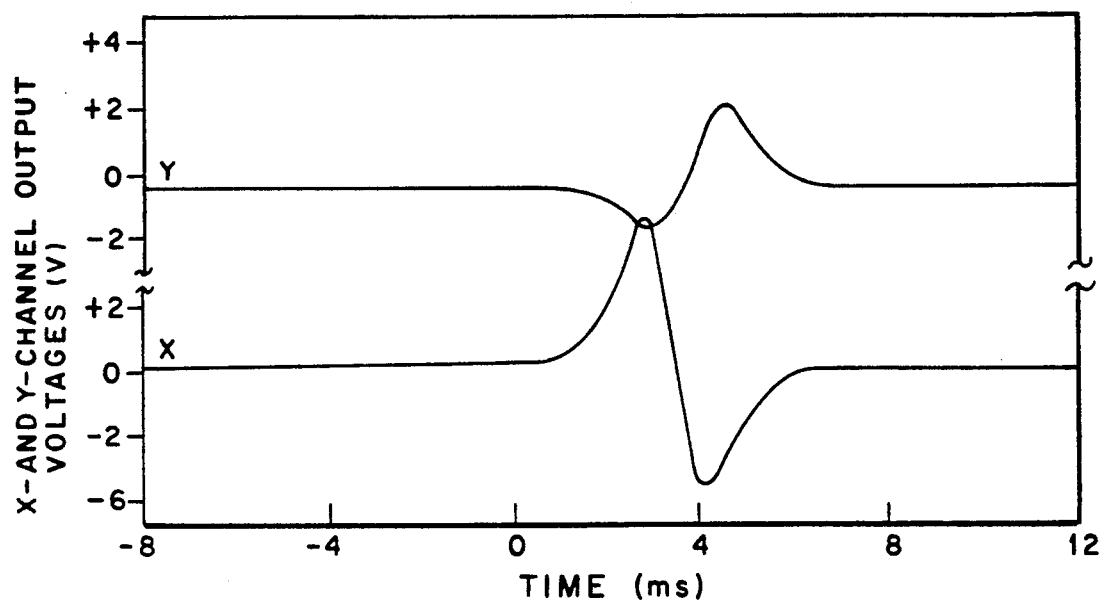
_Fig. 6A_
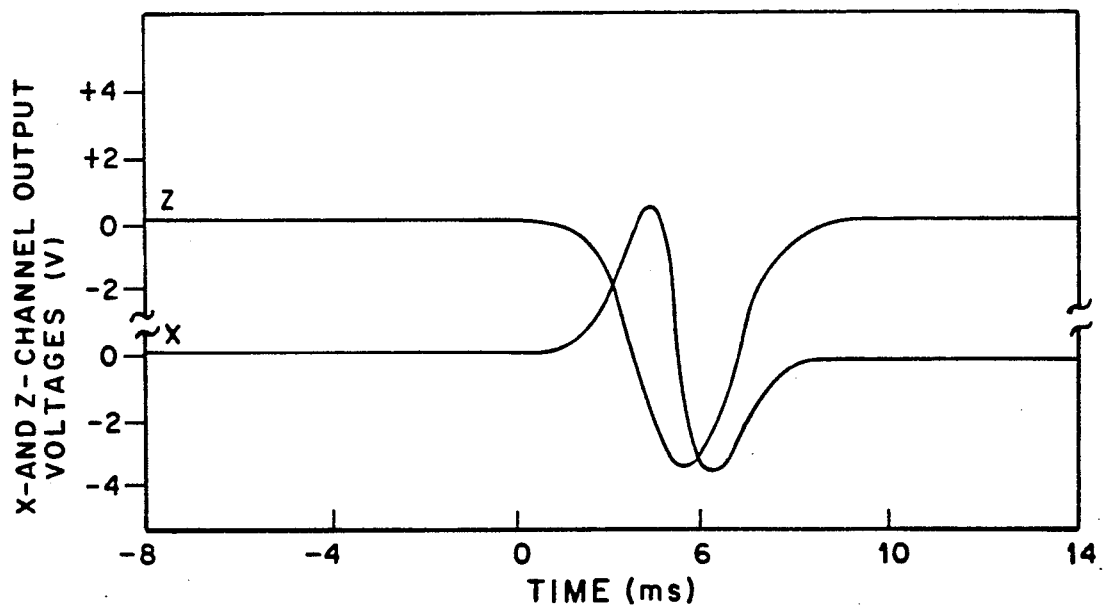
_Fig. 6B_

THREE AXIS VELOCITY PROBE SYSTEM

DESCRIPTION

1. Technical Field

This invention relates to the measurement of particle velocity, and more particularly to a device useful for monitoring the dynamic behavior, e.g. three-axis velocity, of particles in fluidized beds with a minimum of disturbance of particle motion.

2. Background Art

Fluidized bed systems are utilized in numerous industrial processes, such as ion exchange, gas absorption, combustion, etc. For example, one of the advanced processes for more effective use of coal is that of burning the coal in a fluidized bed. In order that such burning can be carried out most efficiently, it is necessary to determine the dynamic behavior of the coal particles while suspended in a gas phase in a fluidized bed reactor. Accordingly, accurate methods for measuring and monitoring this dynamic behavior are required in order to generate geometric profiles such that an adequate data base is available for the design of such combustion systems.

A number of approaches to solid particle velocity measurement have evolved based on various basic principles of operation and adapted to a multitude of applications. For example, the velocity of particles in gas-powder streams has been determined by using capacitance measurements between wall-mounted electrodes that produce simultaneous values of solids flow rate and solids fraction values. This is described by Irons and Chang in "Particle Fraction and Velocity Measurement in Gas-Powder Streams by Capacitance Transducers", International Journal of Multiphase Flow, 9(3). 289–297 (1983). Another approach used particle-produced current flow to two electrodes, separated a known distance apart along the duct carrying the gas-entrained solids, and cross-correlation techniques to obtain particle velocity. This is described by Smith and Klinzing in "Investigation of Particle Velocities in a Gas-Solid System", American Institute of Chemical Engineers, 32(2), 313–316 (1986). An optical technique for particle velocity measurement is described by Birchenough and Mason in "Local Particle Velocity Measurements With a Laser Anemometer in an Upward Flowing Gas-Solid Suspension", Powder Technology, 14(1), 139–152 (1976). Another method of velocity determination is through application of a strain-gage particle impact probe as reported by Raso, Tirabasso and Donsi in "An Impact Probe for Local Analysis of Gas-Solid Flows", Powder Technology, 34(2), 151–159 (1983). Others have investigated variations on these basic approaches as well, all of which are one-axis measurements. Thus, if a plurality of axis measurements are needed, individual instruments must be used to obtain this information. Not only does this involve additional expense, but the presence of several instruments in the flow of a gas-solid stream introduces a disturbance of particle motion and thus reduces the accuracy of measurement.

Accordingly, it is an object of the present invention to provide an instrument that can be used to determine velocity of particles in a flowing gas-solid stream.

It is a further object of the present invention to provide a single instrument that will provide information as to the velocity of particles according to a three-axis plot.

Another object of the present invention is to provide a three-axis particle position velocity probe that minimizes disturbance of particle flow in a gas-solid stream.

A further object of the present invention is to provide an instrument for determining particle velocity in fluidized bed systems.

These and other objects of the present invention will become apparent upon a consideration of the drawings referenced hereinafter together with a detailed description thereof.

DISCLOSURE OF THE INVENTION

In accordance with the present invention, there is provided a very small, six-electrode capacitance-based sensor that is excited by a sinusoidal voltage. There are four electrodes in a central bundle that are enclosed by a guard electrode and then surrounded by a ground electrode. The central sensing electrodes have ends that are all in an X-Y plane (or any two-axis plane) relative to the systems being monitored such that any distance from this plane is in a Z-direction (or third axis). Two of the sensing electrodes are aligned in a Y-direction and two in an X-direction. The sensing electrodes are excited with, for example, a voltage of 500 volts and a frequency of 2 megahertz (MHz). Currents flowing between the individual of the four sensing electrodes and ground are influenced by the presence and position of a particle passing past the sensor head. These currents are amplified and synchronously detected to produce positional X, Y and Z values. The resulting values, after being digitized, at two values of time are used with an internal time base to generate values of the three components of the particle vector and thus establish the velocity of the particle.

BRIEF DESCRIPTION OF THE DRAWINGS

FIGS. 6A and 6B are graphical representations of, respectively, X- and Y-channel output voltages and X- and Z-channel output voltages, as a function of time, as a result of a test particle falling a short distance past the sensor.

BEST MODE FOR CARRYING OUT THE INVENTION

Figure 1:
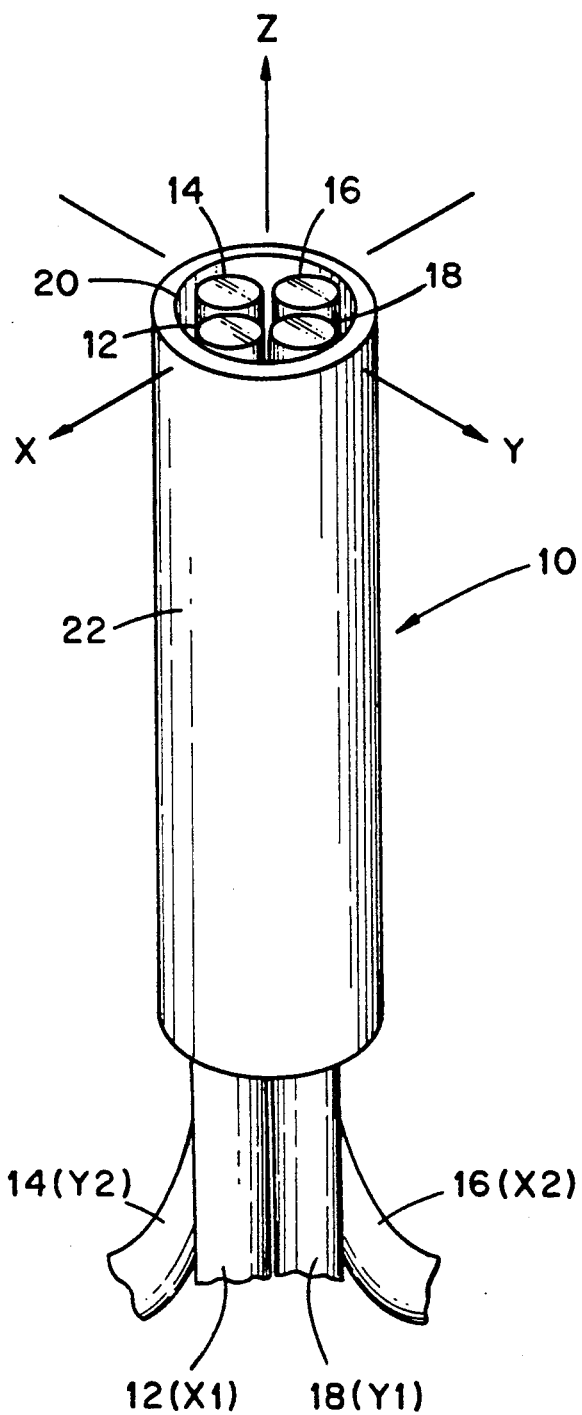
FIG. 1 is an isometric drawing of a sensor head of the present invention showing orientation relative to the X, Y and Z axes.

A sensor head for the present invention is shown generally at 10 in FIG. 1. This figure indicates the three axes for which velocity is to be determined using the present invention. The sensor head 10 is made up of four closely-spaced sensing electrodes 12, 14, 16 and 18. Two of these, i.e., electrodes 12 and 16, are electrodes in the X-direction (referred to as X1 and X2 electrodes), with the other two electrodes 14, 18 (Y1 and Y2 electrodes) being in the Y-direction. In the particular embodiment illustrated, these sensor electrodes can be No. 22 AWG (0.026 in.) copper wires that have a lacquer coating as an insulation. Small sensor heads can be constructed with electrodes about 0.02 to about 0.03 in. in diameter. The exposed ends of the sensing electrodes are flat and polished, and are positioned in an X-Y plane (or in any plane of two of the axes).

The sensor electrodes are closely surrounded by a concentric guard electrode 20 which typically is a 0.083 in. OD × 0.063 in. ID stainless steel cylinder coated with an electrically insulating lacquer. This guard electrode can have other sizes, such as an ID of 0.06 to about 0.075 in., and an OD of about 0.08 to about 0.1 in. The outer layer of the sensor head 10 is a ground electrode 22 that forms a support for the sensor. This ground electrode is typically a stainless steel cylinder having a 0.120 in. OD and a 0.094 in. ID. These dimensions can typically vary, with the ID being about 0.09 to about 0.12, and the OD being about 0.12 to about 0.15 in. It will be understood, however, that a sensor head for the present invention can be constructed having other dimensions. As indicated, the wires that form the sensor electrodes exit the bottom of the ground electrode and can be used to carry signals to and from the associated circuitry as discussed below.

Figure 2:
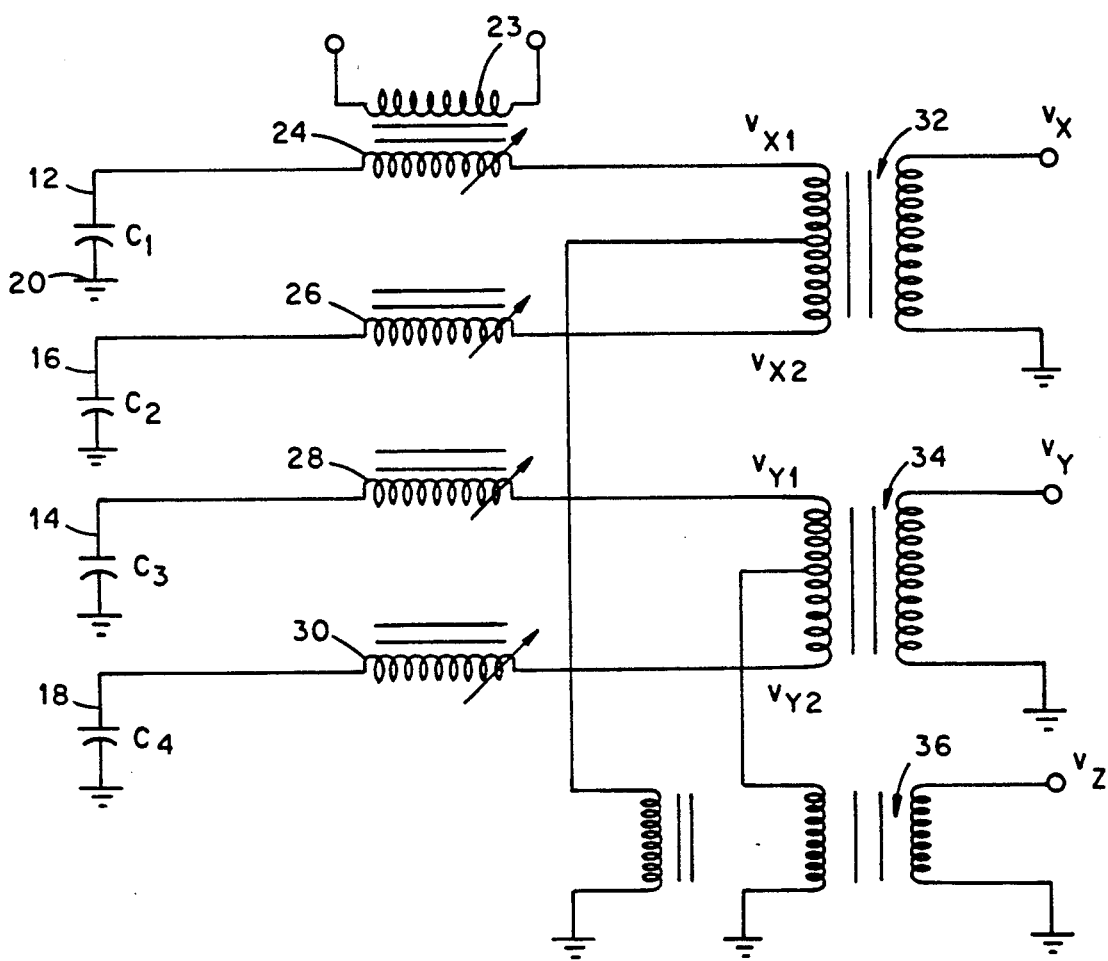
FIG. 2 is a schematic drawing of an excitation circuit for the sensor head of FIG. 1.

A schematic diagram of an excitation circuit for the four sensing electrodes is shown in FIG. 2. Each of the sensing electrodes forms a capacitor with the ground electrode, as indicated as C1, C2, C3 and C4. Ideally, the capacitance of each of these should be equal; however, fabrication conditions may prevent this ideal situation. A sinusoidal voltage, V, typically having a peak-to-peak value of up to 500 volts and a frequency of 2 MHz, is applied between each of the four sensing electrodes and the ground electrode using a primary winding 23 with multiple secondary windings 24, 26, 28 and 30. In addition, although not shown, this voltage is applied between the guard and ground electrodes so that current changes produced by fluctuations in the high electric field region in, and above, the gap between these two electrodes is not introduced into the signal circuits of the four sensing electrodes.

The voltage at each of the transformer secondary windings 24, 26, 28 and 30 is adjustable, as by any suitable means such as varying the number of windings, to produce the exact voltages necessary to compensate for the inequities of the values of capacitance of the four capacitors. In this way the circuit can be adjusted such that the four sensing electrodes carry equal in-phase currents, $i_o$, when no particles are present in the vicinity of the sensing head. It will be understood that other conventional means can be used to supply the correct voltage to each of the sensing electrodes.

Each of the sensing electrodes is connected to an output signal transformer, as at 32, 34, and 36 to receive the respective analog signals, $v_{X1}$, $v_{X2}$, $v_{Y1}$, and $v_{Y2}$ (due to the sensor electrode currents) from the sensing electrodes 12, 16, 14 and 18, respectively. When all of the in-phase currents of the sensing electrodes are equal, the outputs of signal transformers 32 and 34 ($v_X$ and $v_Y$) are zero, and that from transformer 36 ($v_Z$) to be four times the in-phase current.

When a particle having a dielectric constant larger than one appears in the vicinity of the sensor head, the displacement currents change in one or more of the sensing electrode circuits. The change in each of these currents will depend primarily, for a probe of a given design, upon the position of the particle relative to the center of the probe, the dielectric constant of the material of the particle, and the size and shape of the particle. The signal transformer 32 combines the two currents from electrodes 12 and 16 differentially for the output signal $v_X$. Similarly, signal transformer 34 combines the two currents from electrodes 14 and 18 differentially for the output signal $v_Y$. Transformer 36 combines all of the currents for the output signal $v_Z$.

Figure 3:
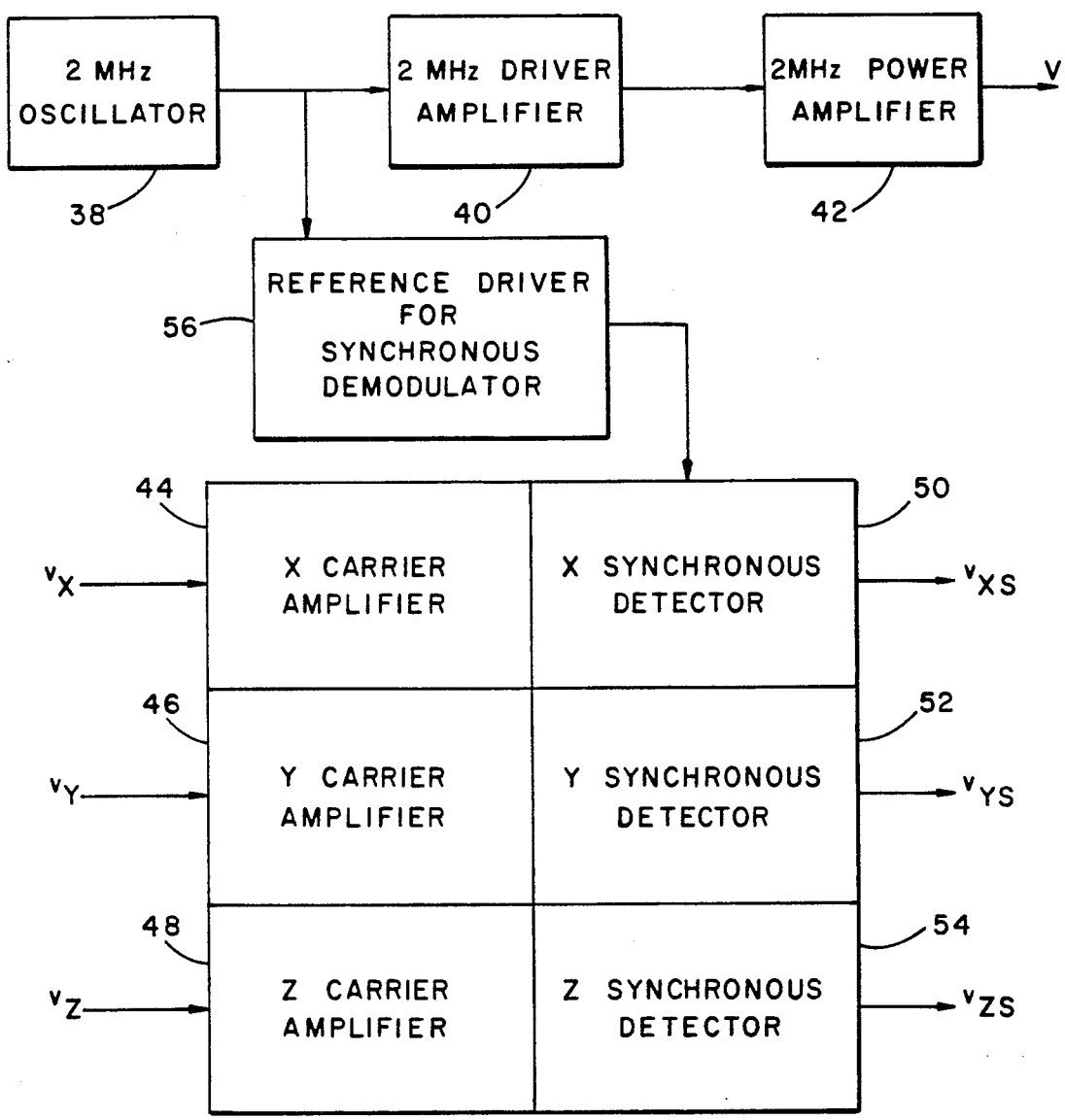
FIG. 3 is a block diagram of a signal generation and detection system for the present invention.

Shown in FIG. 3 is a block diagram of the circuits for creating the excitation voltage, V. An oscillator 38, running at the selected frequency (e.g., 2 MHz), feeds an amplifier 40. The output therefrom, in turn, feeds a power amplifier 42 to provide the typical 500 volts peak-to-peak value for V. As discussed hereinafter, other voltages and frequencies can be used.

This FIG. 3 also illustrates the amplification of the outputs from the signal transformers (see FIG. 2) in the form of $v_X$, $v_Y$ and $v_Z$. This amplification is carried out, respectively, in carrier amplifiers 44, 46 and 48. The signals are synchronously detected in detectors 50, 52 and 54 using a further output signal from the oscillator 38 through a reference driver 56 for this synchronous demodulation. This provides the synchronously detected signals $v_{XS}$, $v_{YS}$ and $v_{ZS}$. The technology of carrier amplifiers and synchronous detectors will be known to those skilled in the art.

Figure 4:
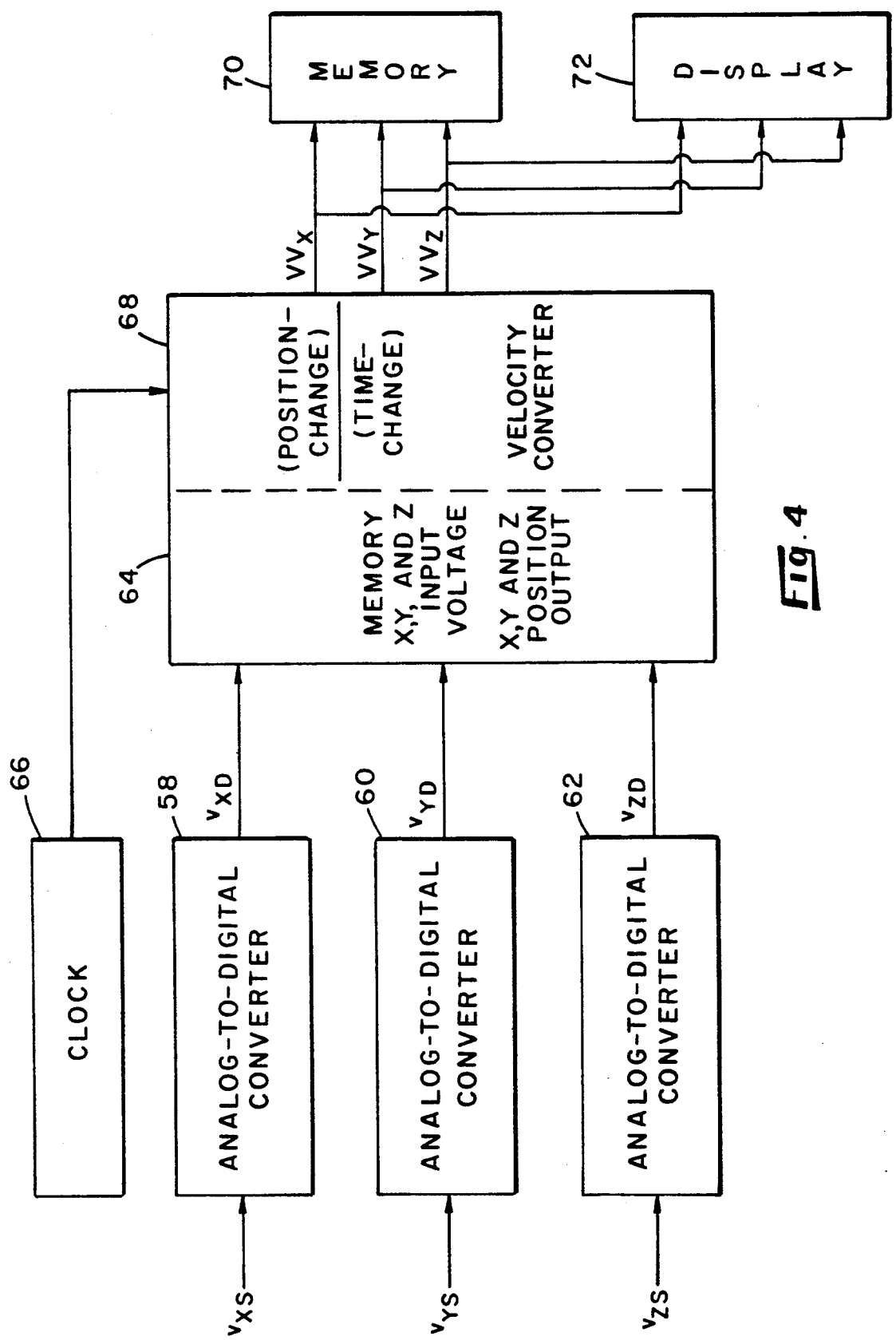
FIG. 4 is a block diagram of a signal processing system for the present invention.

Shown in FIG. 4 is how these three synchronously detected signals are converted to digital values in conventional analog-to-digital converters 58, 60 and 62, respectively. The outputs, in digital form, are used to address a memory unit 64. This memory unit contains digital calibration data to provide a particular set of particle position coordinate values for a particular set of the X, Y and Z digital values.

In order to obtain these calibration data, a particle that is representative of those to be monitored is moved via a micropositioner to a series of known points in a truncated prolate spherical volume above the sensing electrodes. The origin of the coordinate system is selected at the center of the guard electrode 20 in the X-Y plane (see FIG. 1) where Z equals zero. These data may be tens to thousands of points depending on the resolution that is desired. At each point the values of the three coordinate signals are used as a memory address code, and the particle position is stored in memory at this address. The actual positional values are clocked at regular time intervals (as using clock 66) of known length introduced to the velocity converter section 68 associated with the memory unit 64 where the three components of the velocity vector are computed, i.e., $VV_X$, $VV_Y$ and $VV_Z$. These velocity data can be stored in memory unit 70 for later analysis and/or used to generate a real-time display, in display unit 72, of the velocity vectors of the particles passing by the sensor head.

Figure 5A:
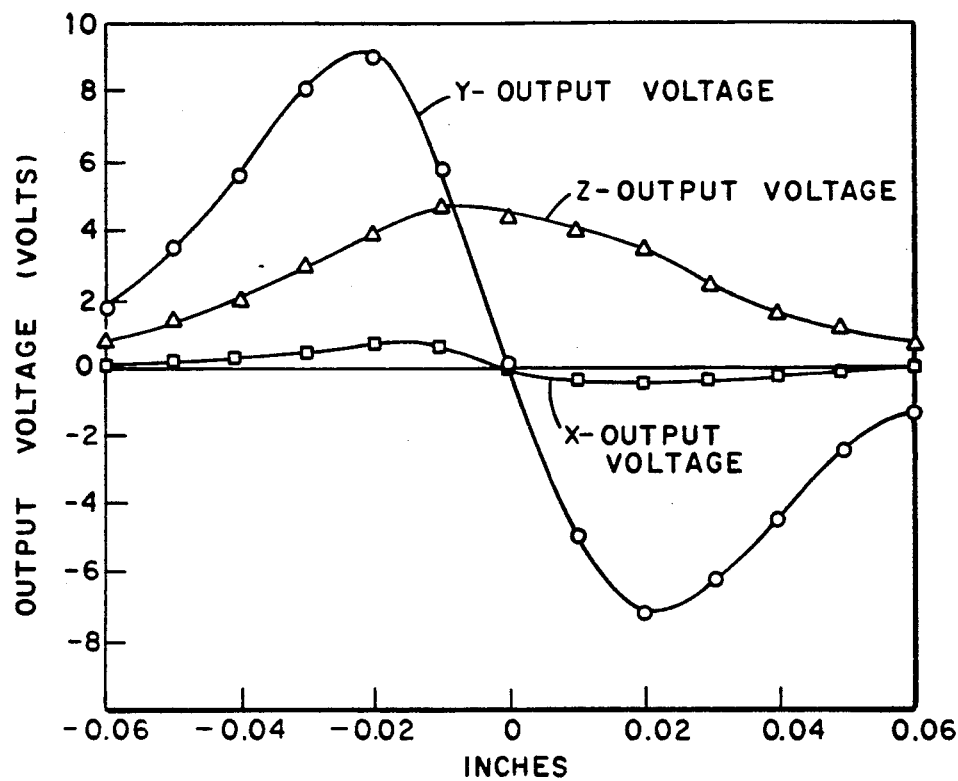
FIG. 5A is a graphical representation of the Y-axis position signal generated by the present invention for a test sphere with the X- and Z-axis positions fixed at zero.
Figure 5B:
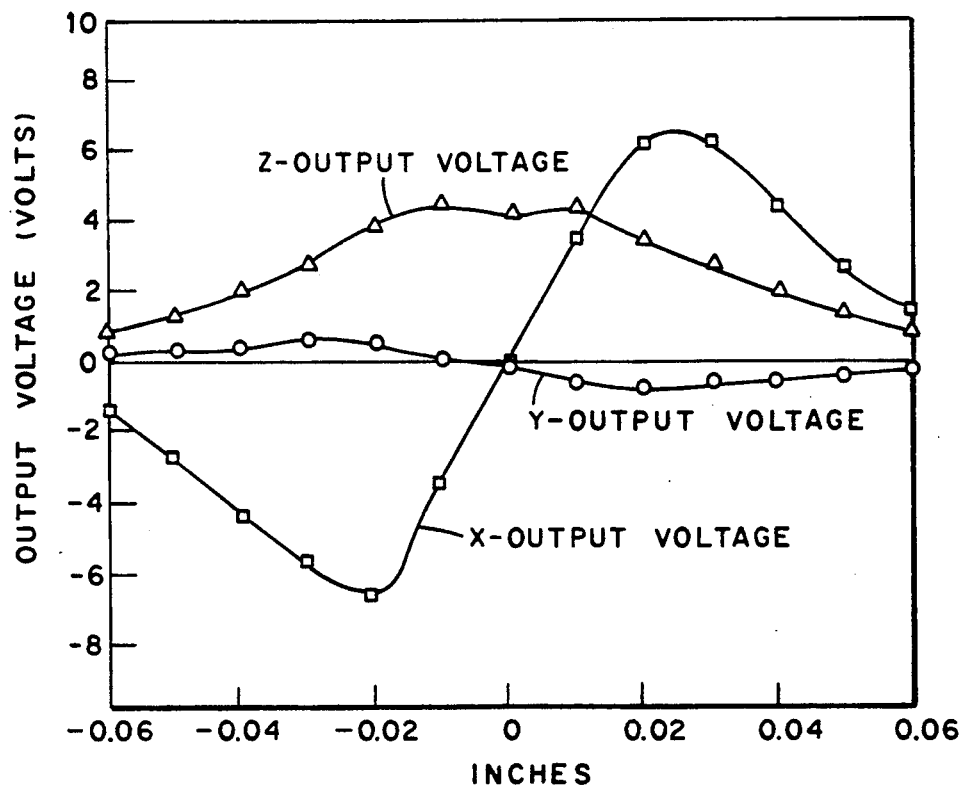
FIG. 5B is a graphical representation of the X-axis position signal generated by the present invention for a test sphere with the Y- and Z-axis positions fixed at zero.

Tests were conducted using a sensor head such as described above. A nylon sphere having a diameter of 0.125 in. was placed adjacent the ends of the sensing electrodes. Values of X, Y, and Z circuit output voltages were measured when the center of the sphere placed at known positions relative to the center of the flat surface of the electrodes (in the X-Y plane). Data plotted in FIG. 5A are a small sample of collected calibration data with the particle moved to positions along the Y-axis with the X and Z positions maintained constant at zero. The data plotted in FIG. 5B are similar except the particle was moved along the X-axis with the Y and Z positions maintained constant at zero. These data indicate that such a calibration is feasible and will indicate a unique particle position for each set of X, Y and Z signal voltage values.

The sensor head was then fixed in position such that the flat surface of the head (again the X-Y plane) was in a vertical plane with the centers of the X1 (12) and X2 (16) sensing electrodes lying on a vertical line. A 0.125 in. diameter nylon sphere was dropped from 1½ in. above the sensor head such that the sphere passed through the sensing volume in front of the X-Y plane. Typical results of these tests are given in FIGS. 6A and 6B, where FIG. 6A is a plot of the X and Y output voltages and FIG. 6B is a plot of the X and Z output voltages. Again it is shown that the sensor will provide information as to the position of the three axes for a particle passing past the sensor head. Using the data plotted in these figures, a measure of the X, Y and Z components of velocity can be obtained as $\Delta d_i / \Delta t_i$, where $\Delta d_i$ is the distance between two points on the electrode containment surface of the sensor head along the i-th axis, and $\Delta t_i$ is the time of travel between these two points. For example, the travel time between the centers of the X electrodes is approximated as the distance between the positive and negative peaks of the X output voltage (FIG. 6A). This gives a time differential of approximately 1.4 milliseconds. The points along the X-axis at which these extremes of output occur are estimated as being 0.04 in. apart (using calibration data of FIG. 5). Thus, the estimated X component of velocity can be calculated as being 2.38 feet per second. This compares to the theoretical value of velocity of 2.84 after a free fall of 1.5 in.

Figure 7A:
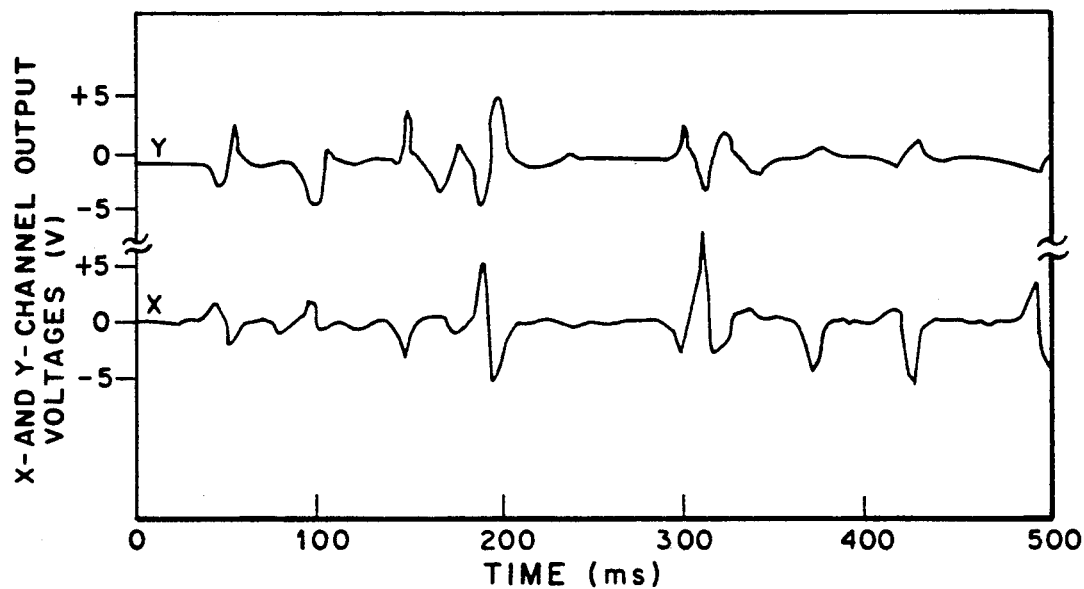
FIGS. 7A and 7B are graphical representations of, respectively, X- and Y-channel output voltages and X- and Z-channel output voltages, as a function of time, as obtained in a dilute region of a fluidized bed using 700 micrometer plastic particles.
Figure 7B:
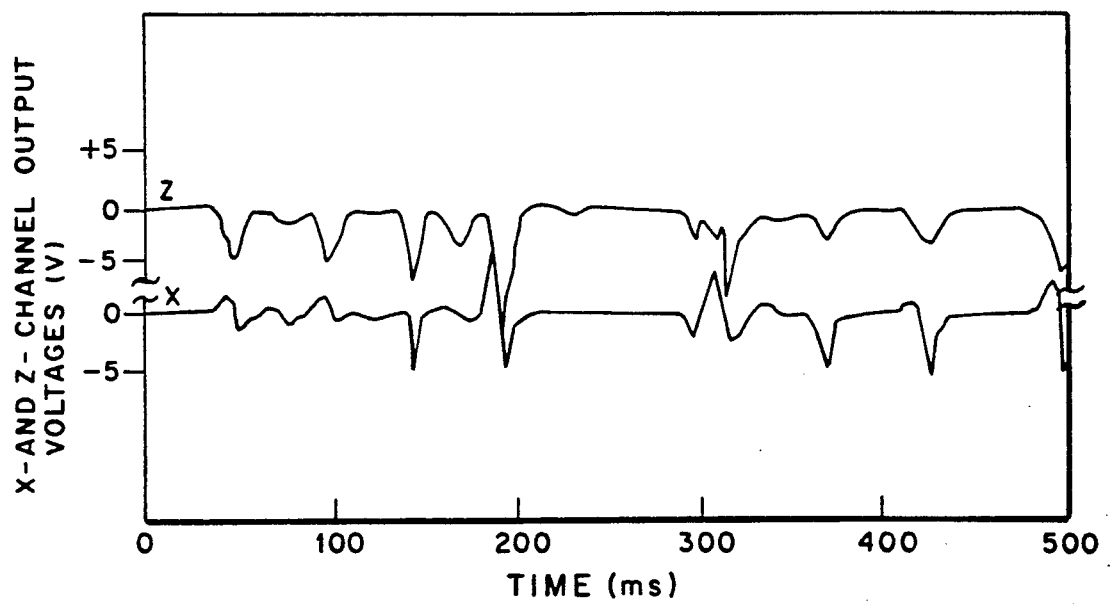

The velocity probe of the present invention was placed in a 6 in. diameter fluidized bed apparatus with a dilute concentration of 700 micrometer nylon spheres. The data obtained are plotted in FIGS. 7A and 7B. Since the X, Y and Z signals were all simultaneously recorded, these signals can be transformed into $X_P$, $Y_P$ and $Z_P$ particle position coordinates using calibration characteristics for 700 micrometer particles similar to those shown in FIGS. 5A and 5B, for 0.125 in. nylon spheres. Using these data, the individual and combined velocity vectors are computed using conventional equations, as follows:

$$VV_X = \frac{X_p(t_2) - X_p(t_1)}{t_2 - t_1}$$

$$VV_Y = \frac{Y_p(t_2) - Y_p(t_1)}{t_2 - t_1}$$

$$VV_Z = \frac{Z_p(t_2) - Z_p(t_1)}{t_2 - t_1}$$

$$VV = [VV_X^2 + VV_Y^2 + VV_Z^2]^{\frac{1}{2}} / \alpha, \beta, \delta;$$

where $t_1$ and $t_2$ are the initial and final position times, respectively, and $\alpha$, $\beta$ and $\delta$ are the velocity vector's X, Y and Z direction angles.

From the foregoing it will be understood by persons skilled in the art that a device has been developed for determining particle velocity in a three axis system. The size of the sensor head (typically 0.12 in.) is sufficiently small that essentially no effect is noted on bed particle flow dynamics, yet there is good sensitivity to particle size down to 700 micrometer diameters. It can be readily calibrated for particle positions out to nearly 0.125 in. from the sensor head tip for particles of this size. While the circuitry is presently available to operate at bandwidths of 20 kHz with 2 MHz excitation, other known circuits will permit the bandwidth to be extended to 200 kHz to permit higher velocity and/or smaller particle sensing. The voltage also can be increased above the value of 500 volts to increase sensitivity of the device. This may require additional spacing between the sensing electrodes and the guard and ground electrodes. Accordingly, it will be noted that the values of size, frequency and excitation voltage are given for illustration purposes and not for a limitation of the present invention. Rather, the invention is to be limited only by the appended claims and their equivalents.

We claim:

1. A sensor head for obtaining signals related to three-axis velocity vectors of moving particles, which comprises:
    a bundle of four closely-spaced sensing electrodes each insulated from an adjacent sensing electrode and each having a flat end positioned in a plane of two axes where a third axis is perpendicular to said plane, two of said sensing electrodes aligned along one of said axes of said plane and two of said sensing electrodes aligned along a second of said axes of said plane;
    a guard electrode closely surrounding, and insulated from, said four sensing electrodes, said guard electrode having an end terminating in said two-axis plane;
    a ground electrode closely surrounding, and insulated from, said guard electrode, said ground electrode serving as a support for said sensing head; and
    electrical connections to said sensing electrodes, said guard electrode and said ground electrode.

2. The sensing head of claim 1 wherein said sensing electrodes are copper wires having a diameter of about 0.02 to about 0.03 in., said guard electrode is a stainless steel cylinder having an inner diameter of about 0.06 to about 0.075 in. and an outer diameter of about 0.08 to about 0.1 in., and said ground electrode is a stainless steel cylinder having an inner diameter of about 0.09 to about 0.12 in. and an outer diameter of about 0.12 to about 0.15 in., said sensing electrodes and said guard electrode having an insulative coating.

3. A system for determining three-axis particle position velocities, which comprises:
    a sensor head, said sensor head having
        a. a bundle of four closely-spaced sensing electrodes, each insulated from an adjacent sensing electrode, and each having a flat end positioned in a two-axis plane where a third axis is perpendicular to said plane, two of said sensing electrodes aligned along one of said axes of said plane and two of said sensing electrodes aligned along a second of said axes of said plane,
        b. a guard electrode closely surrounding, and insulated from, said four sensing electrodes, said guard electrode having an end terminating in said two-axis plane, c. a ground electrode closely surrounding, and insulated from, said guard electrode, said ground electrode serving as a support for said sensing head, and d. electrical connections to said sensing electrodes, said guard electrode and said ground electrode;

means connected to said electrical connections for applying a selected voltage of a selected value and frequency between each of said sensing electrodes and said ground electrode and between said guard electrode and said ground electrode;

signal measuring means connected to said electrical connections for determining currents flowing between each of said sensing electrodes and said ground electrode and for generating signals related to changes in said currents due to the presence of particles adjacent said sensor head; and means for converting said signals related to current changes into velocity vector values for determining three-axis velocity of particles as a function of position relative to said sensor head.

4. The system of claim 3 wherein said sensing electrodes are copper wires having a diameter of about 0.02 to about 0.03 in., said guard electrode is a stainless steel cylinder having an inner diameter of about 0.06 to about 0.075 in. and an outer diameter of about 0.08 to about 0.1 in., and said ground electrode is a stainless steel cylinder having an inner diameter of about 0.09 to about 0.12 in. and an outer diameter of about 0.12 to about 0.15 in., said sensing electrodes and said guard electrode having an insulative coating.

5. The system of claim 3 wherein said means for applying a selected voltage comprises:

an oscillator circuit for generating said selected frequency;

means for generating an excitation voltage of said selected value at said selected frequency; and means for applying said excitation voltage between said sensing electrodes and said ground electrode, and between said guard electrode and said ground electrode.

6. The system of claim 5 wherein said means for applying said excitation voltage between said sensing electrodes and said ground electrode includes means for adjusting said excitation voltage to each of said sensing electrodes whereby currents flowing between each of said sensing electrodes and said ground electrode are equal when no particle is present adjacent said sensing head.

7. The system of claim 3 wherein said signal measuring means comprises:

means for differentially adding currents from said pair of sensing electrodes aligned along said one axis to obtain a first axis differential signal due to presence of said particles, for differentially adding currents from said second pair of sensing electrodes aligned along said second axis to obtain a second axis differential signal due to presence of said particles, and for adding currents of said first and second pairs of sensing electrodes to obtain a third axis differential signal due to presence of said particles; and means for amplifying and synchronously detecting said differential first axis signals, said differential second axis signals and said differential third axis signals to produce unipolar output signals for each of said axes.

8. The system of claim 7 wherein said means for converting said signals related to said changes in said currents of said sensing electrodes into velocity vector signals comprises:

means for converting said unipolar output signals for each of said axes into digital signals for each of said axes;

means for comparing said digital signals to digital calibration signals stored in memory and for determining a change in said digital signals as a function of time and for computing a velocity vector signal for each of said three axes due to movement of said particles proximate said sensor head.

9. The system of claim 8 further comprising means for storing in memory said velocity vector signals for each of said three axes.

10. The system of claim 8 further comprising means for generating a real-time display of said velocity vector signals of each of said three axes.

11. A system for determining three-axis particle position velocities, which comprises:

a sensor head, said sensor head having a. a bundle of four closely-spaced sensing electrodes, each insulated from an adjacent sensing electrode, and each having a flat end positioned in a two-axis plane where a third axis is perpendicular to said plane, two of said sensing electrodes aligned along one of said axes of said plane and two of said sensing electrodes aligned along a second of said axis of said plane, b. a guard electrode closely surrounding, and insulated from, said four sensing electrodes, said guard electrode having an end terminating in said two-axis plane, c. a ground electrode closely surrounding, and insulated from said guard electrode, said ground electrode serving as a support for said sensing head, and d. electrical connections to said sensing electrodes, said guard electrode and said ground electrode;

means connected to said electrical connections for applying a selected voltage of a selected value and frequency between each of said sensing electrodes and said ground electrode, and between said guard electrode and said ground electrode, said means for applying said voltage having a. an oscillator circuit for generating said selected frequency, and b. means for generating an excitation voltage of said selected value at said selected frequency;

signal measuring means connected to said electrical connections for determining currents flowing between each of said sensing electrodes and said ground electrode and for generating signals related to changes in said currents due to the presence of particles adjacent said sensor head, said signal measuring means having a. means for differentially adding currents from said pair of sensing electrodes aligned along said one axis to obtain a first axis differential signal due to presence of said particles, for differentially adding currents from said second pair of sensing electrodes aligned along said second axis to obtain a second axis differential signal due to presence of said particles, and for adding currents of said first and second pairs of sensing electrodes to obtain a third axis differential signal due to presence of said particles, and c. means for amplifying and synchronously detecting said differential first axis signals, said differential second axis signals and said differential third axis signals to produce unipolar output signals for each of said axes; and converting means for converting said signals related to current changes into velocity vector values for determining three-axis velocity of particles as a function of position relative to said sensor head, said converting means having a. means for converting said unipolar output signals for each of said axes into digital signals for each of said axes, and b. means for comparing said digital signals to digital calibration signals stored in memory, for determining a change in said digital signals as a function of time, and for computing a velocity vector signal for each of said three axes due to movement of said particles proximate said sensor head.

12. The system of claim 11 wherein said sensing electrodes are copper wires having a diameter of about 0.02 to about 0.03 in., said guard electrode is a stainless steel cylinder having an inner diameter of about 0.06 to about 0.075 in. and an outer diameter of about 0.08 to about 0.10 in., and said ground electrode is a stainless steel cylinder having an inner diameter of about 0.09 to about 0.12 in and an outer diameter of about 0.12 to about 0.15 in.

13. The system of claim 11 further comprising means for storing in memory said velocity vector signals for each of said three axes.

14. The system of claim 11 further comprising means for generating a real-time display of said velocity vector signals of each of said three axes.

* * * * *